United States Patent Office 3,606,821
Patented Sept. 21, 1971

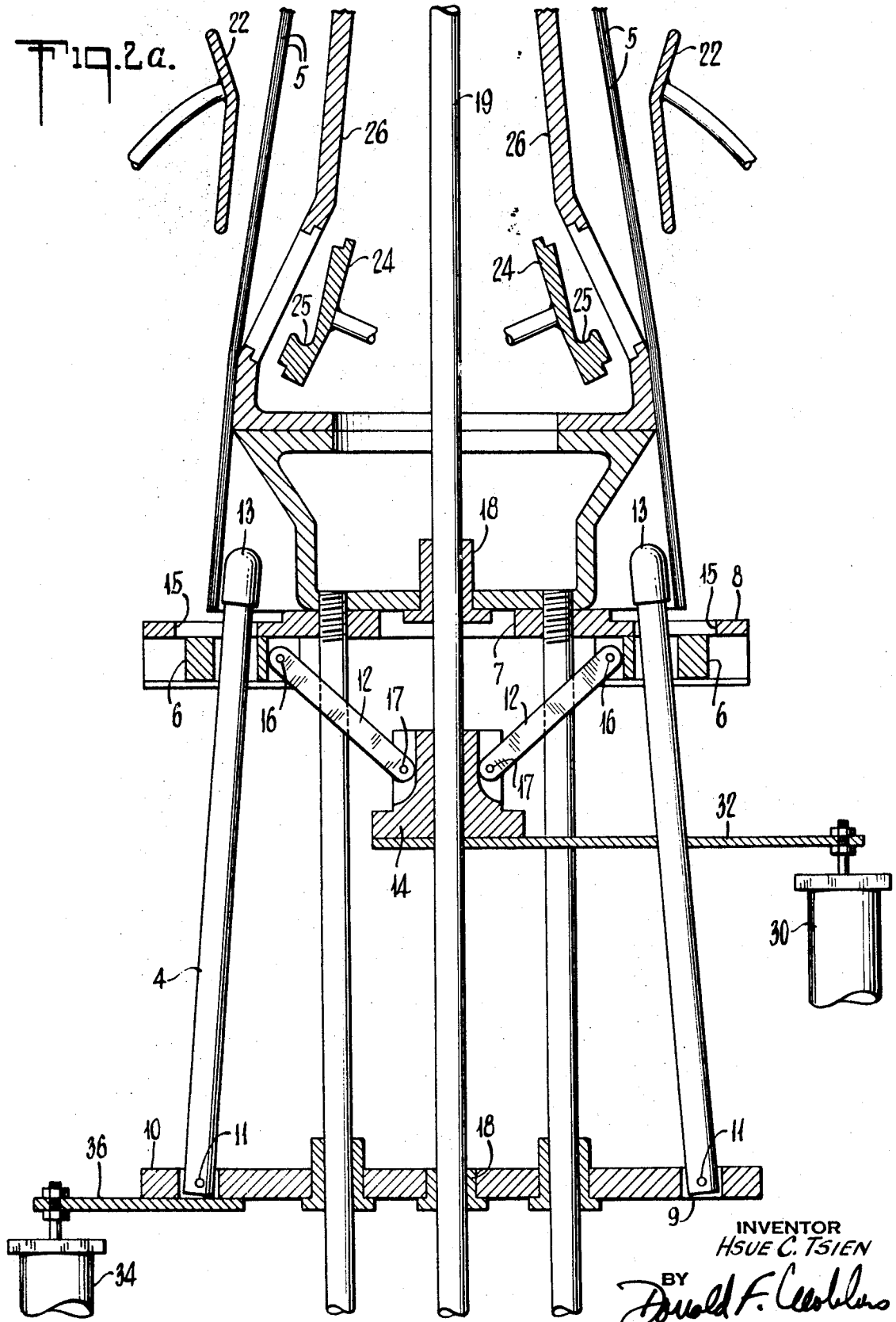

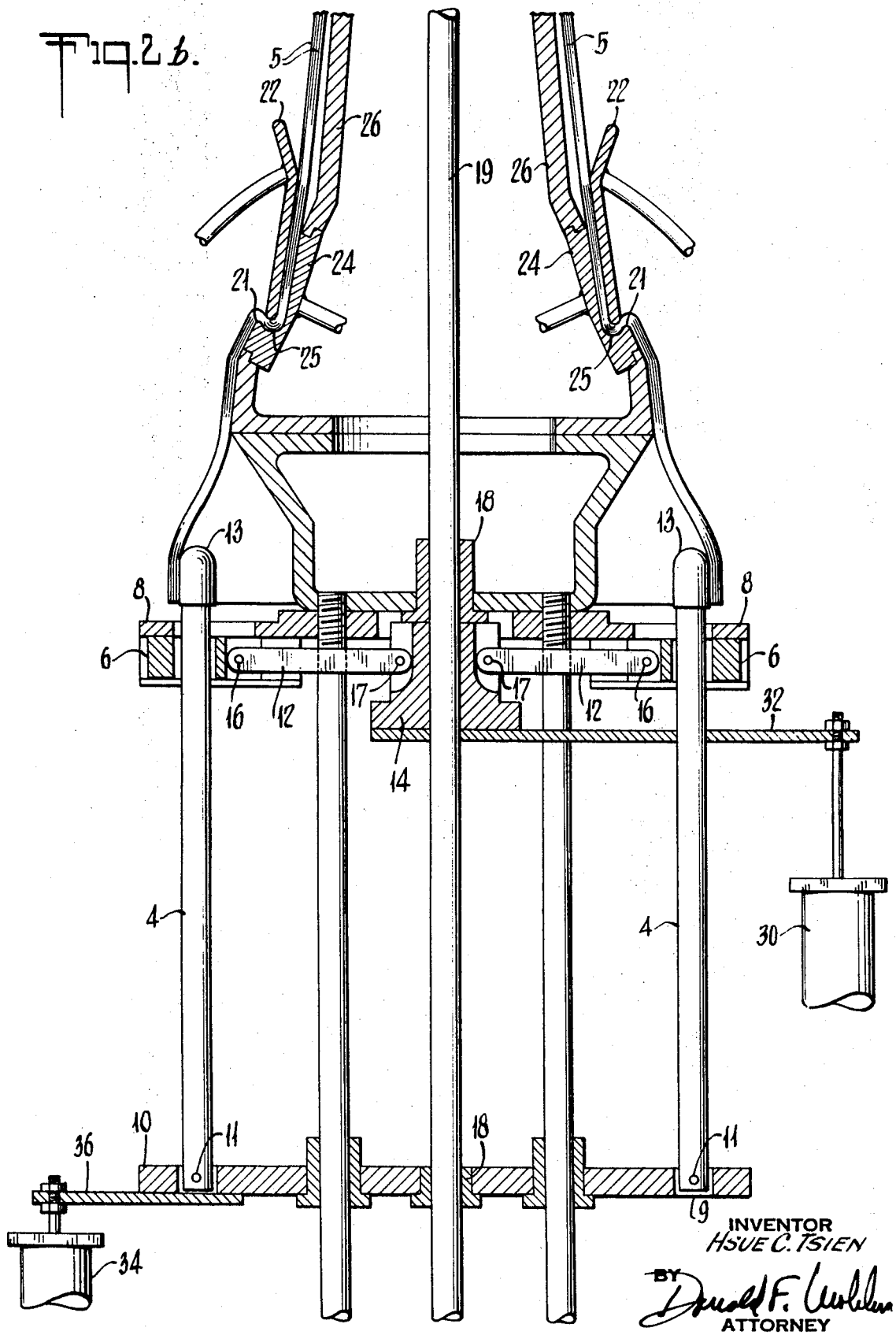

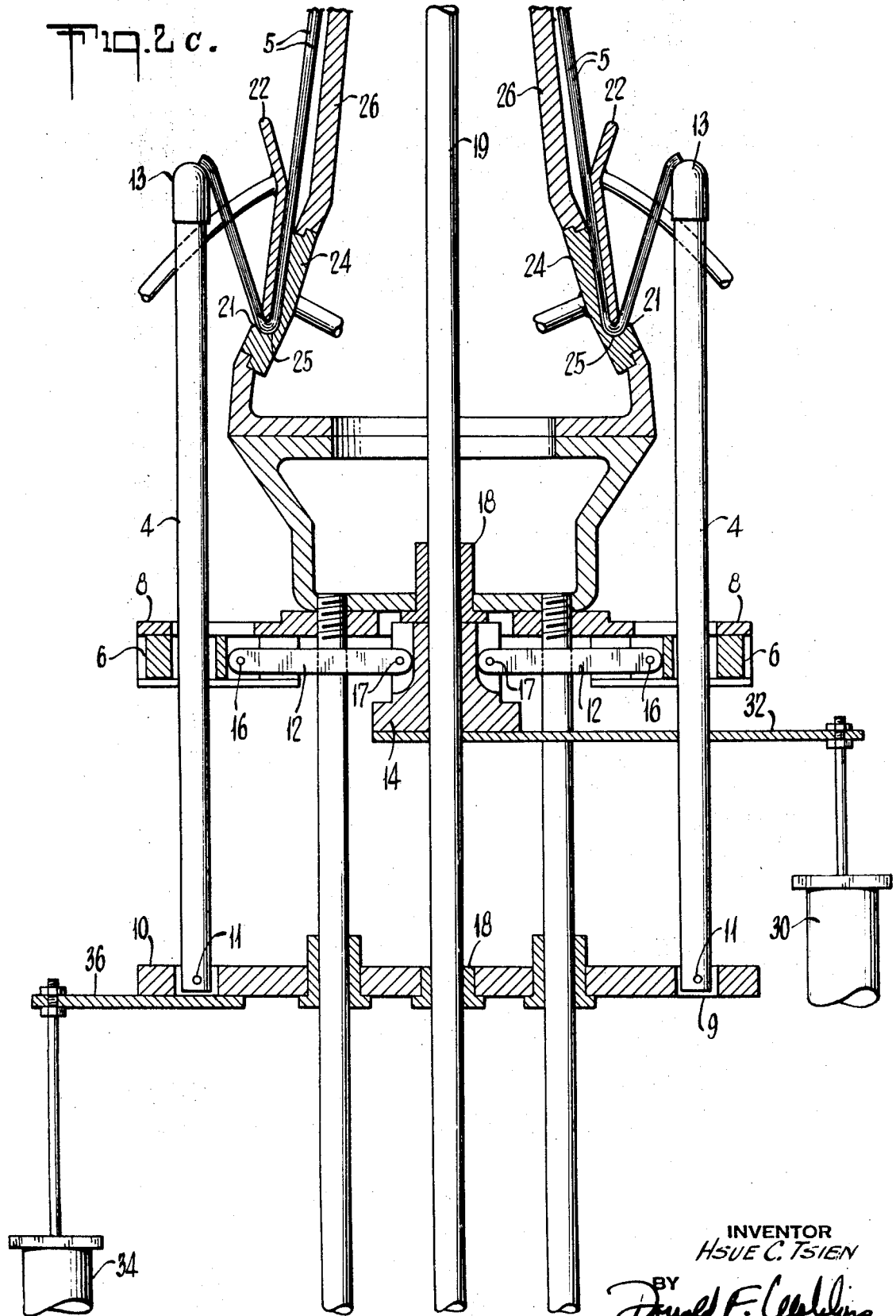

3,606,821
APPARATUS FOR CUFFING NEST OF BAGS
Hsue C. Tsien, Livingston, N.J., assignor to Esso Research and Engineering Company
Filed May 28, 1969, Ser. No. 831,818
Int. Cl. B31b 1/00
U.S. Cl. 93—8R 12 Claims

ABSTRACT OF THE DISCLOSURE

An apparatus for cuffing a plurality of nested bags. The bags are disposed on a bag supporting frame of the apparatus and held thereto by bag holding means. Means are provided for turning the ends of the nested bags over the bag holding means thus providing the bags with cuffs.

BACKGROUND OF THE DISCLOSURE

Up to the present time, one of the greatest potential markets for flexible plastic materials such as polyethylene and polypropylene has not been exploited. That is, the use of flexible plastic materials as bags for the loading of grocery products at the supermarket checkout counter. This, in spite of the fact that a plastic bag costs less than a paper bag with the same capacity. The reason for the nonpenetration of this high volume market has been the expense and difficulty of handling flexible plastic bags. Obviously, if a method were found to load plastic bags so that could easily be filled with grocery products at the checkout counter, a whole new market would open for these plastic products.

The apparatus of the instant invention is directed to an improvement in the handleability of these plastic bags so that they may be used in the supermarket or grocery store. This improvement is directed to an apparatus which cuffs a plurality of nested bags. That is, a plurality of open bags disposed one inside the other (nested) are folded at the open end with fold disposed over the unfolded section of the bag (cuffed). Such an arrangement of nested and cuffed bags is suitable for disposition on a dispenser adapted to receive such bags. In applicant's copending application (Ser. No. 823,317, filed May 9, 1969, entitled "Dispenser for Nested and Cuffed Bags") a dispenser is disclosed which is so adapted to receive a plurality of nested and cuffed bags so as to provide a convenient means of handling flexible bags at a grocery checkout counter.

The instant invention is directed generally to an apparatus for cuffing flexible bags. More specifically, it is directed to an apparatus for the cuffing of plastic bags. More specifically, it is directed to an apparatus for cuffing a plurality of nested, plastic bags.

SUMMARY OF THE INVENTION

The apparatus of the instant invention presents a unique means for cuffing a plurality of nested bags. According to the apparatus of the instant invention, a plurality of nested bags are disposed on a bag supporting frame of the apparatus with the open ends of the bags disposed over a bag turning means. Means are provided for holding the bags to the bag supporting frame. Thence, bag turning means are provided to engage the ends of the bags under tension and turn said ends over the bag holding means thus providing the plurality of nested bags with cuffs. Means associated with said bag turning means are provided for activating said bag turning means so as to engage the bags and turn their ends. The apparatus of the instant invention is also provided with bag removal means in order to remove the bags from the bag supporting frame.

BRIEF DESCRIPTION OF THE DRAWINGS

FIG. 2 is a series of schematic representations of the bag turning mechanism of the instant invention.

DETAILED DESCRIPTION

Figure 1:
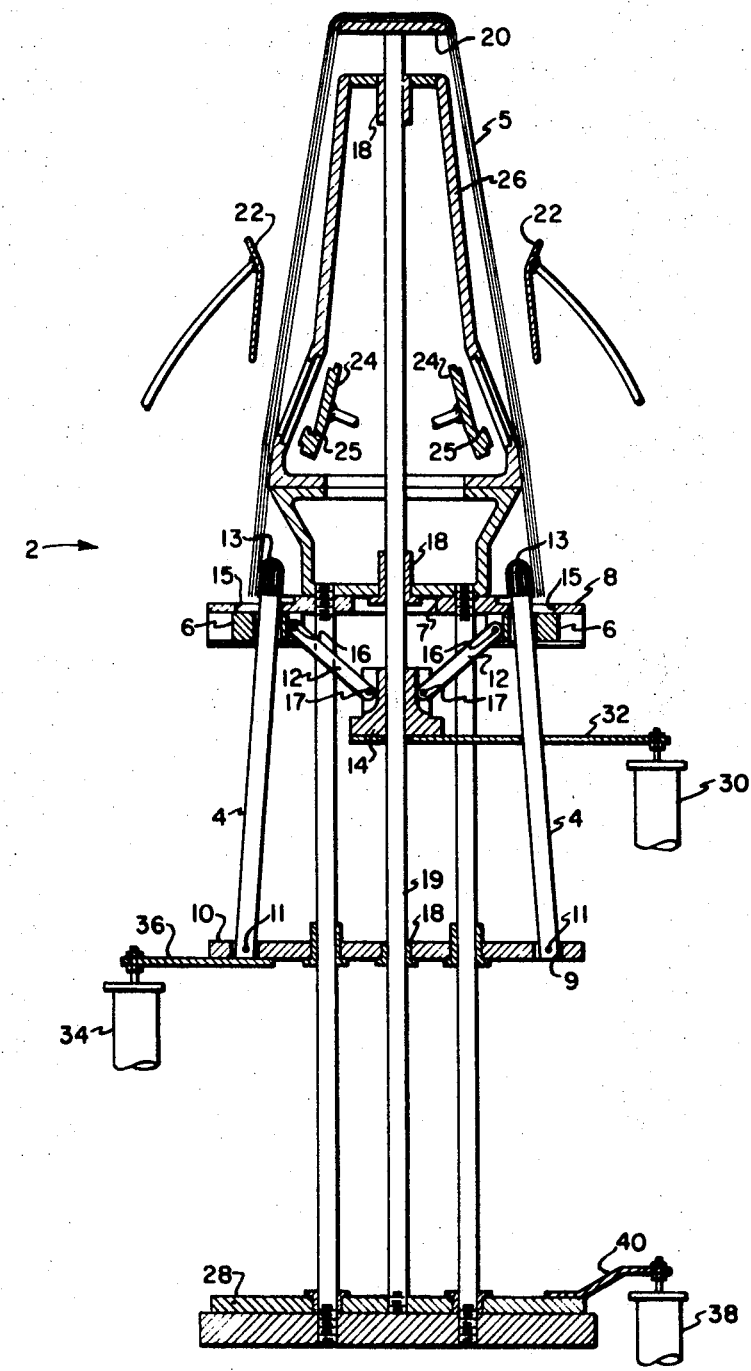
FIG. 1 is a sectional elevation view of the instant invention.

Turning to FIG. 1, a sectional elevation view of the apparatus of the instant invention is illustrated. The apparatus for cuffing a plurality of nested bags is denoted generally at 2. It comprises a bag supporting frame, a bag holding means, a bag cuffing means, and a bag removal means.

All the elements of the apparatus of the instant invention are disposed about a knockout bar shaft 19. The shaft 19 comprises a solid, cylindrical rod connected at one end to a base plate 28 and at the other to a knockout plate 20. Guide sleeves 18 are disposed at several places along the length of the shaft 19 to prevent lateral movement of said shaft 19. Base plate 28, knockout plate 20 and knockout bar shaft 19 comprise the bag removal means which are described in greater detail hereinafter.

The bag supporting frame comprises a metal frame 26 disposed around the shaft 19 below the knockout plate 20. The frame 26, in a preferred embodiment is hollow. A plurality of nested bags 5 are disposed over the hollow frame 26. The frame is dimenstioned so that the bags 5 are disposed in an open position with their closed ends disposed over the knockout plate 20. An element of the frame, which will be described in greater detail hereinafter, is at least one creasing die 24. The creasing die 24 is disposed within the hollow frame 26 and when activated moves to the surface of the frame 26 in an open space provided on the frame 26 to accommodate the die 24.

The bag holding means comprises at least one crease clamp 22 disposed adjacent to the frame 26. After the bags are disposed over the frame 26, the clamp 22 is activated so that it moves over the bags 5 holding them firmly, sandwiched between the frame 26 and the clamp 22. In one preferred embodiment two clamps 22 are disposed over a plurality of nested bags 5. Alternately, a single clamp (e.g., a band capable of being tightened and released) shaped to the contours of the frame 26 or a plurality of small clamps which would serve the same purpose can be substituted for the preferred embodiment. Fluid power activating means are provided to move the clamp 22 into contact with the bags 5 on the frame 26. The same means are employed to move the clamps 22 away from the frame 26 to permit the bags 5 to be removed. The number of creasing dies 24 which communicate with the clamps in a preferred embodiment is the same number as the number of clamps 22 employed. Thus, in a preferred embodiment, two dies 24 are disposed opposite the two crease clamps 22. In a preferred embodiment fluid activating means are employed to move the creasing die onto the outer surface of the frame 26 and in an opposite direction to move the dies 24 back within the hollow frame 26. Specifically, air cylinder sources are used to activate both the clamps 22 and the dies 24. The operation of these elements will be described in greater detail hereinafter.

The bag turning means comprises a plurality of cuffing rods 4 disposed on a plate 10 designated for identification, a cuffing plate. The rods 4 are disposed in a plurality of slots or oversized holes 9 cast or machined in the cuffing plate 10. The other end of the rods 4 is coated with a smooth plastic 13. In a preferred embodiment the ends of the rods are coated with Teflon (a registered trademark of E. I. du Pont de Nemours & Co. for polytetrafluoroethylene). Each rod 4 is connected to the plate 10 by means of a pin 11 about which the rod 4 is free to pivot. In operation the cuffing rods 4 pivot in and out as will be described hereinafter. In order to provide this function, a central guide bushing 14 is movably disposed around shaft 19. The central guide bushing 14 is connected to the cuffing rods 4 by means of a plurality of links 12 which each connect to the central guide bushing by means of a pin 17. Each link 12 is connected to a guide bushing 6 disposed around each of the cuffing rods 4. Again, the guide bushing 6 is connected to the link 12 by means of a pin connection 16. The vertical movement of the central guide bushing 14 is converted into radial movement of the cuffing rods 4 by means of the bushing connections, as will be described in greater detail hereinafter. The upward movement of the central guide bushing 14 is controlled by means of a stop bushing 18 disposed directly beneath the frame 26 and above the central guide bushing 14. Thus, the central guide bushing 14 is disposed between the cuffing plate 10 and the stop bushing 18. Support plate 8 is disposed around the knockout bar shaft 19 by means of a centerhole 7 through which the knockout bar shaft 19 extends. Plate 8 is also provided with a plurality of holes 15 disposed around the outer edge of the plate. These holes permit the disposition of the cuffing bars through the support plate 8. The holes 15 are large enough to permit pivoting of the cuffing bars 4 in radial direction as well as permitting vertical movement of these bars 4. The upward movement of the central guide bushing 14 is provided by a first air cylinder 30 in communication with bushing 14 by means of a first bar 32. A second air cylinder 34 communicates with the cuffing plate 10 by means of a second bar 36, which provides the means by which the cuffing rods move up to turn over the ends of the bags 5 as will be described hereinafter.

In a preferred embodiment the support plate 8 as well as the cuffing plate 10 are rectangular with four cuffing bars located at the four corners of the plate. Depending upon the application, other configurations may be employed using other shaped plates and a different number of cuffing bars.

FIGS. 2a, 2b, 2c and 3 illustrate the method of operation of the instant invention. FIGS. 2a, 2b and 2c illustrate the steps in the operation of the bag turning mechanism and the corresponding operation of the bag holding means. In FIG. 2a the bag turning mechanism is illustrated in the open or loading position. In this position the cuffing plate 10 is at its lowest position on the knockout bar shaft 19, that is the position of the plate 10 closest to the base plate 28. In this position the cuffing bars 4 are in their inward position, that is their position closest to the shaft 19. In this position the plurality of rods 4 are disposed inside of the plurality of nested bags 5.

Again referring to FIG. 2a the position of the bag holding means is illustrated for the period during which the apparatus is in the open position. Thus, FIG. 2a illustrates portions of the apparatus 2 in the same period of time. In FIG. 2a the plurality of nested bags 5 are disposed about over the frame 26. It should be noted that the surface of the frame 26 upon which the creasing dies 24 are ultimately disposed is open providing means for moving the creasing dies 24 onto the surface adjacent the bags 5. The creasing dies 24 are disposed inside the frame 26 at this period of time. FIG. 2a also illustrates again the bag overlap of the tips of the cuffing bars 4.

The next step in the process is illustrated in FIG. 2b. The crease clamp 22 moves inward to clamp over the plurality of bags 5, followed by the outward movement of the creasing dies 24. The bags are thus sandwiched between the frame 26 and the creasing clamps 22 thus holding the bags in a firm nonmovable position. Moreover, the portion of the frame 26 left open for movement thereupon of the creasing dies 24 causes the additional effect on the bags 5 of precreasing them. The dies 24 are cast with a fold provided at 25. Thus when the clamps 22 and dies 24 squeeze the bags between them a precrease is provided on the bags 5. The precrease is illustrated in FIG. 2b at 21.

FIG. 2b also illustrates the next step in the process illustrated. The central guide bushing 14 is moved vertically upward along the knockout bar shaft 19. The movement of the central guide bushing 14 is activated by the flow of pressurized air in cylinder 30 which transmits movement through bar 32, thus activating bushing 14. Although air pressure is used to move the guide bushing 14 in a preferred embodiment, a solenoid electrical activation system or a mechanical system may also be used. The movement of the central guide bushing 14 results in extension of the links 12 in a position parallel to that of the cuffing plate 10. This results in an extension of the cuffing bars 4 radially outward so that the top of the bars 4 push out and expand the open end portion of the plurality of nested bags 5 to a reasonable tightness. It should be appreciated that the holes 15 disposed on the support plate 8 are wide enough to accommodate the radial movement of the cuffing bars 4 in their outward movement. In FIG. 2b, the cuffing bars 4 are illustrated in their outward position whereby they place the ends of the bags 4 under tension.

Turning now to FIG. 2c the next step in the process is illustrated. With the plurality of bags 5 precreased at 21 and disposed between the crease clamps 22 on one side and the frame 26 and the creasing dies 24 on the other, and with the cuffing bars disposed under the plurality of bags 5 so that the bags are under tension, the cuffing plate 10 is moved upward in a vertical direction. Thus, in FIG. 2c the cuffing plate 10 is shown at a higher position than in FIG. 2b illustrating the movement of the cuffing plate 10. The cuffing plate movement is controlled by means of the flow of pressurized air in cylinder 34 which transmits movement through bar 36, thus activating cuffing plate 10. In other embodiments a solenoid electrical system or a mechanical system may also be used for this purpose. The upward movement of the cuffing plate 10 in turn causes the upward vertical movement of the cuffing rods 4 which results in the folding of the ends of the bags upward around the crease clamps 22 at the precrease line 21. The nested bags 5 are thereby cuffed as illustrated in FIG. 2c.

Figure 3:
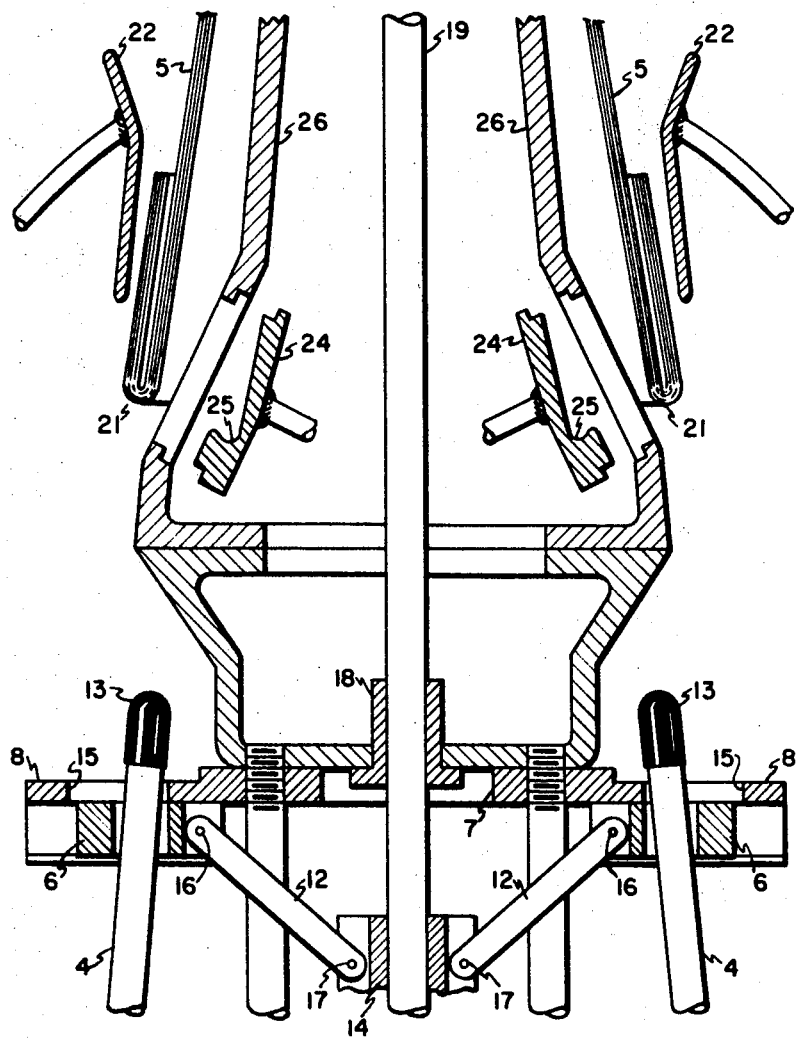
FIG. 3 is a sectional elevation view of the bag holding means of the instant invention.

The next step in the process is the upward and outward movement of the crease clamps 22 and the inward movement of the creasing dies 24 whereby the nested and cuffed bags are released. The vertical outward movement of the crease clamps 22 is a critical step because the clamps 22 must be removed in such a manner so as not to disturb the cuff formed on the bags. This critical step is activated by means of an air pressure source (not shown). Again, alternate means of movement can be used. Thus, other fluid activating sources, solenoid electrical systems or any other mechanical system may be used for this sequentially operated movement. FIG. 3 illustrates the position of the dies 24 and the clamps 22 after this movement is complete.

The final step in the process is the removal of the plurality of nested and cuffed bags from the frame 26. The movably disposed knockout bar shaft 19 is moved upward by means of a pressurized air source in a vertical direction thereby moving upward the knockout plate 20 which is connected to the knockout bar shaft 19. The resultant upward movement of the knockout plate 20 forces upward the closed end bottom of the plurality of nested and cuffed bags 5 such that they are removed from the frame 26 and thereafter easily taken off the plate 20. Specifically, flow of pressurized air in a cylinder 38 activates a bar 40 which moves base plate 28. Base plate 28 moves knockout bar shaft 19 thus causing vertical movement. Again, although an air pressure source is employed to furnish upward movement to the knockout bar shaft 19, alternate fluidized, electrical or mechanical means for providing this movement may be substituted.

What is claimed is:

1. An apparatus for cuffing a plurality of flexible bags comprising:
   (a) a bag supporting frame over which said bags are disposed;
   (b) a bag holding means for holding said bags to said bag supporting frame;
   (c) a bag turning means disposed below said bag supporting frame and adapted to engage the open ends of said bags, for turning the ends of said bags over said bag holding means thereby cuffing said bags;
   (d) means associated with said bag turning means for activating said bag turning means in a vertical direction whereby said bag turning means turns the ends of said bags.

2. The apparatus of claim 1 wherein said bag turning means includes a cuffing plate disposed around a shaft, below said body portion, and a plurality of cuffing rods disposed on said cuffing plate at one end and under said bags at the other end.

3. The apparatus of claim 2 including a central bushing movably disposed on said shaft between said cuffing plate and said bag supporting frame, said central bushing connected to a plurality of bushings disposed around each of said plurality of cuffing rods by means of a plurality of linkages, so that vertical movement of said central bushing causes radial outward movement of said cuffing rods.

4. The apparatus of claim 3 including a stop bushing disposed around said shaft directly below said body portion and above said cuffing plate, said stop bushing provided with a plurality of holes large enough to accommodate vertical and radial movement of said cuffing rods which are disposed through said holes, said stop bushing serving to limit the upward movement of said central bushing thus controlling the radial movement of said cuffing bars.

5. The apparatus of claim 4 wherein the bag holding means comprises at least one crease clamp engaged to hold said plurality of bags tightly against said bag supporting frame, said clamp holding said bags until said bag turning means causes the end of said bags to fold over said clamp, said clamp releasing said bags by an upward and outward movement whereby the cuffs formed by this operation are not disturbed.

6. The apparatus of claim 5 including at least one creasing die disposed inside said bag supporting frame, said die comprising a plate which is designed with a fold, said die being capable of being moved in contact with said bags so that said bags are squeezed between said die and said crease clamp so that a crease around which the ends of said bags are ultimately folded is formed.

7. The apparatus of claim 6 wherein said means for activating said bag turning means includes a pressurized air source in communication with said cuffing plate whereby said cuffing plate moves in a vertical direction thus causing said cuffing rods to fold the ends of said bags over said crease clamps thereby forming a cuff on said bags.

8. The apparatus of claim 7 where said bag supporting frame comprises a hollow metal frame disposed around said shaft, said frame provided with an opening into which said creasing die, disposed within said frame, may be moved.

9. The apparatus of claim 1 including bag removal means, said means comprising a movable shaft connected at one end to a knockout plate over which said closed ends of said bags are disposed, said bags are removed from said apparatus by the upward movement of said shaft whereby said knockout plate moves said bags upward, off said bag supporting frame.

10. An apparatus for cuffing a plurality of nested bags comprising:
    (a) a bag supporting frame over which said nested bags are disposed;
    (b) a movable shaft disposed through said frame;
    (c) a cuffing plate movably disposed around said shaft;
    (d) a plurality of cuffing rods pivotally disposed in holes provided in said cuffing plate;
    (e) a plurality of guide bushings, one of said bushings disposed around each of said cuffing rods;
    (f) a central guide bushing movably disposed on said shaft above said cuffing plate, said central bushing connected to said plurality of guide bushings by means of a plurality of linkages, which translate the vertical motion of said central guide bushing into radial motion of said cuffing rod away from said shaft thus engaging the ends of a plurality of nested bags in tension;
    (g) a stop bushing disposed around said shaft between said frame and said cuffing plate designed to limit the vertical movement of said central guide bushing, said bushing provided with a plurality of holes through which said plurality of cuffing rods extends;
    (h) a plurality of crease clamps which hold said plurality of bags tight against said bag supporting frame;
    (i) a means for moving said cuffing plate and said plurality of cuffing rods disposed on said plate vertically toward said frame thereby turning the ends of said plurality of nested bags over said crease clamps, thereby forming a cuff on said bags;
    (j) a plate connected to said shaft over which the closed end of said nested bags are disposed, said plate serving to remove said bags from said apparatus by the upward movement of said shaft.

11. The apparatus of claim 10 including a plurality of creasing dies disposed within said bag supporting frame which are moved out onto the surface of said bag supporting frame as said crease clamps hold said bags to said bag supporting frame so that said bags are pressed between said clamps and said die causing a crease to be made in said bags prior to the upward movement of said cuffing bars which turn said ends of said bags over said crease clamp at said crease.

12. An apparatus for cuffing a plurality of nested flexible bags comprising:
    (a) a bag supporting frame;
    (b) a plurality of nested flexible bags disposed on said frame;
    (c) a bag holding means for holding said bags to said bag supporting frame;
    (d) a bag turning means disposed below said bag supporting frame and adapted to engage the open ends of said bags, for turning the ends of said bags over said bag holding means thereby cuffing said bags;
    (e) means associated with said bag turning means for activating said bag turning means in a vertical direction whereby said bag turning means turns the ends of said bags.

References Cited
UNITED STATES PATENTS

| | | | |
|---|---|---|---|
| 2,893,294 | 7/1959 | Eaton et al. | 93—8 |
| 3,513,755 | 5/1970 | Nestler et al. | 93—8X |

GRANVILLE Y. CUSTER, JR., Primary Examiner